United States Patent
Schwab

(10) Patent No.: US 10,240,014 B2
(45) Date of Patent: Mar. 26, 2019

(54) HIGH CLARITY AND STRENGTH POLYETHYLENE FILMS

(71) Applicant: Equistar Chemicals, LP, Houston, TX (US)

(72) Inventor: Thomas Schwab, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 416 days.

(21) Appl. No.: 14/919,487

(22) Filed: Oct. 21, 2015

(65) Prior Publication Data

US 2016/0115284 A1  Apr. 28, 2016

Related U.S. Application Data

(60) Provisional application No. 62/069,614, filed on Oct. 28, 2014.

(51) Int. Cl.
*B32B 27/32* (2006.01)
*C08J 5/18* (2006.01)
*B32B 27/08* (2006.01)

(52) U.S. Cl.
CPC ............. *C08J 5/18* (2013.01); *B32B 27/08* (2013.01); *B32B 27/32* (2013.01); *B32B 2250/03* (2013.01); *B32B 2250/05* (2013.01); *B32B 2250/242* (2013.01); *B32B 2250/40* (2013.01); *B32B 2270/00* (2013.01); *B32B 2307/406* (2013.01); *B32B 2307/412* (2013.01); *B32B 2307/54* (2013.01); *B32B 2307/546* (2013.01); *B32B 2307/581* (2013.01); *B32B 2307/5825* (2013.01); *B32B 2307/72* (2013.01); *B32B 2307/7246* (2013.01); *B32B 2323/043* (2013.01); *B32B 2323/046* (2013.01); *B32B 2439/02* (2013.01); *B32B 2439/70* (2013.01); *C08J 2323/06* (2013.01); *C08J 2423/06* (2013.01)

(58) Field of Classification Search
CPC ............ B32B 2250/03; B32B 2250/05; B32B 2250/242; B32B 2250/40; B32B 2270/00; B32B 2307/406; B32B 2307/412; B32B 2307/54; B32B 2307/546; B32B 2307/581; B32B 2307/5825; B32B 2307/72; B32B 2307/7246; B32B 2323/043; B32B 2323/046; B32B 2439/02; B32B 2439/70; B32B 27/08; B32B 27/32; C08J 2323/06; C08J 2423/06; C08J 5/18
See application file for complete search history.

(56) References Cited

U.S. PATENT DOCUMENTS

| 5,491,011 A * | 2/1996 | Pezzoli ............... B32B 27/32 428/215 |
| 2010/0316869 A1 | 12/2010 | Shelley et al. |
| 2012/0207954 A1 | 8/2012 | Dalpe et al. |

OTHER PUBLICATIONS

PCT International Search Report and the Written Opinion—dated Dec. 15, 2015 (Dec. 15, 2015) for Corresponding PCT/US2015/056958.

\* cited by examiner

*Primary Examiner* — Lawrence D Ferguson

(57) ABSTRACT

A film having an A/B/A structure comprising an layer A and a layer B. The layer A is present in an amount ranging from 25 to 65 wt. %, based upon the total weight of the A/B/A structure, and the layer A comprises a first A layer and a second A layer each independently comprise linear low density polyethylene. The layer B is present in an amount ranging from 35 to 75 wt. %, based upon the total weight of the A/B/A structure, and the layer B, which comprises high density polyethylene, is positioned between the first A layer and the second A layer.

18 Claims, No Drawings

HIGH CLARITY AND STRENGTH POLYETHYLENE FILMS

CROSS-REFERENCES TO RELATED APPLICATIONS

This application claims benefit and priority of U.S. Provisional Patent Application No. 62/069,614, filed on Oct. 28, 2014, the content of which is incorporated herein by reference in its entirety.

FIELD OF THE INVENTION

The present disclosure relates to the field of polymer chemistry. More specifically, the present disclosure relates to polyolefin compositions and articles of manufacture made therefrom. In particular, the present disclosure provides compositions and/or films having a particular balance of strength, clarity, and improved product shelf life.

BACKGROUND

For film applications requiring good optical properties (low haze, high gloss, high see-through clarity) such as bread bags and zipper storage bags, converters typically use blends of LDPE and LLDPE or LDPE and mLLDPE. The cast film or blown film processes are the usual methods for making these films. These films generally show deficiencies in the following areas that would be desired for improvement.

Toughness—Low puncture properties limit the ability to create thin films. Poor toughness increases the potential for film failure and consequently spoilage of the bags' contents.

Film Stiffness—Even with improved toughness, if the current films are down-gauged, the resulting film becomes flimsy. Lower stiffness films are more difficult to process in down-stream operations (slitting, printing, bag-filling, etc.). In addition, consumers may associate a flimsier bag as a lower quality product.

Product Freshness—Many clarity film applications are used for the packaging of perishable food items. A bag that enables a product to have a longer shelf life is desired because that bag can limit the amount of product that becomes stale while sitting on the grocery store shelves.

SUMMARY

The present disclosure provides films having an A/B/A structure comprising:
(A) a layer A, wherein the layer A:
  (i) is present in an amount ranging from 25 to 65 wt. %, based upon the total weight of the A/B/A structure, and
  (ii) the layer A comprises a first A layer and a second A layer each independently comprise linear low density polyethylene; and
(B) a layer B, wherein the layer B comprises high density polyethylene:
  (i) is present in an amount ranging from 35 to 75 wt. %, based upon the total weight of the A/B/A structure, and
  (ii) the layer B is positioned between the first A layer and the second A layer,
wherein the film has a gauge from 0.7 to 1.8 mils, and wherein the film has a water vapor transmission rate of 0.25 to 0.95 g/100 si/day.

The letter "A" in the A/B/A structure is either the first A layer or the second A layer. In each A/B/A structure, both the first A layer and the second A layer are present.

In some embodiments, the first A layer is present in an amount ranging from 12.5 to 32.5 wt. %, based upon the total weight of the A/B/A structure.

In some embodiments, the second A layer is present in an amount ranging from 12.5 to 32.5 wt. %, based upon the total weight of the A/B/A structure.

In some embodiments, the first A layer and the second A layer comprises a linear low density polyethylene composition. The linear low density polyethylene composition comprises:
(a) 94.5 to 100 wt. %, based upon the total weight of the linear low density polyethylene composition, of a linear low density polyethylene; and
(b) 0.0 to 5.5 wt. %, based upon the total weight of the linear low density polyethylene composition, of a low density polyethylene composition.

In some embodiments, the linear low density polyethylene composition has a melt index ranging from 0.4 to 2.5 dg/min, measured according to ASTM D 1238 at 190° C. using a load of 2.16 kg.

In some embodiments, the linear low density polyethylene composition has a density ranging from 0.890 to 0.940 g/cm$^3$.

In some embodiments, the linear low density polyethylene composition has a polydispersity ranging from 1.8 to 6.0.

In some embodiments, the low density polyethylene composition has a melt index ranging from 0.1 to 0.6 dg/min, measured according to ASTM D 1238 at 190° C. using a load of 2.16 kg.

In some embodiments, the low density polyethylene composition has a density ranging from 0.910 to 0.940 g/cm$^3$.

In some embodiments, the linear low density composition comprises a nucleator. In some embodiments, the low density polyethylene composition comprises: (1) from 95 to 100 wt. %, based upon the total weight of the low density polyethylene composition, of a low density polyethylene; and (2) from 0.0 to 5 wt. %, based upon the total weight of the low density polyethylene composition, of a nucleator.

In some embodiments, the layer B comprises a high density polyethylene (HDPE) polymer composition. In some embodiments, the HDPE composition comprises a blend containing.
(a) 40 to 100 wt. %, based upon the total weight of the HDPE polymer composition, of a high density polyethylene homopolymer or of a high density polyethylene copolymer;
(b) 0 to 50 wt. %, based upon the total weight of the HDPE polymer composition, of a linear low density polyethylene composition; and
(c) 0 to 10 wt. %, based upon the total weight of the HDPE polymer composition, of a nucleated polyolefin composition.

In some embodiments, the HDPE composition includes a 100 wt. %, based upon the total weight of the HDPE composition, of a HDPE hompolymer. In some embodiments, the HDPE composition includes 100 wt. %, based upon the total weight of the HDPE composition, of a HDPE copolymer containing ethylene derived units and monomeric units derived from butene, pentene, hexene, or octene. In some embodiments, the nucleated polyolefin composition contains 95 to 99.9 wt. %, based upon the total weight of the nucleated polyolefin composition, of a polyolefin; and (2) 0.1 to 5 wt. %, based upon the total weight of the nucleated polyolefin composition, of a nucleator. In some embodiments, the polyolefin is: (i) a low density polyethylene homopolymer or copolymer; or (ii) a high density polyethylene homopolymer or copolymer.

In some embodiments, the high density polyethylene composition has a melt index ranging from 0.4 to 2.5 dg/min, measured according to ASTM D 1238 at 190° C. using a load of 2.16 kg.

In some embodiments, the high density polyethylene composition has a polydispersity ranging from 1.8 to 18.

In some embodiments, the high density polyethylene composition comprises a nucleator.

In some embodiments, the film has a gloss measured at 45° ranging from 60 to 80.

In some embodiments, the film has a haze ranging from 5 to 14%.

In some embodiments, the film has a narrow angle scatter from 10 to 60.

In some embodiments, the film has a transverse direction Elmendorf tear of 250 to 600 grams.

In some embodiments, the film has a max force puncture of 27 to 45 N.

In some embodiments, the film has a water vapor transmission rate of 0.25 to 0.95 grams of water per 100 square inches per day ("g/100 si/day").

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

DETAILED DESCRIPTION

Definitions

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "mil" as used herein equals 0.001 inch.

The term "haze" as used herein refers to the percentage of transmitted light that in passing through the polymer deviates from the incident beam by forward scattering. In some commercial hazemeters only light deviating more than 2.5° from the transmitted beam direction is considered haze. In general, the effect of haze is to impart a cloudy or milky appearance to the sample, but its transparency need not be reduced. Transparency is defined as the sate permitting perception of objects through or beyond the specimen. For example, a sample of low transparency may not exhibit haze, but objects seen through it will appear blurred or distorted.

The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

The term "ASTM D 1746" as used herein refers to the standard test method for determining transparency of plastic sheeting. The attribute of clarity of a sheet, measured by its ability to transmit image-forming light, correlates with its regular transmittance. Sensitivity to differences improves with decreasing incident beam- and receptor-angle. If the angular width of the incident beam and of the receptor aperture (as seen from the specimen position) are of the order of 0.1° or less, sheeting of commercial interest have a range of transparency of about 10 to 90% as measured by this test. Results obtained by the use of this test method are greatly influenced by the design parameters of the instruments; for example, the resolution is largely determined by the angular width of the receptor aperture. Caution should therefore be exercised in comparing results obtained from different instruments, especially for samples with low regular transmittance. Regular transmittance data in accordance with this test method correlate with the property commonly known as "see-through," which is rated subjectively by the effect of a hand-held specimen on an observer's ability to distinguish clearly a relatively distant target. This correlation is poor for highly diffusing materials because of interference of scattered light in the visual test. This test method was approved on Feb. 1, 2009 and published March 2009, the contents of which are incorporated herein by reference in its entirety. For the referenced ASTM standards, visit the ASTM website, www.astm.org, or contact ASTM Customer Service at service@astm.org.

The term "ASTM E111" as used herein refers to the standard test method for determining the Young's Modulus, tangent modulus and chord modulus. According to this method, a uniaxial force is applied to the test specimen and the force and strain are measured, either incrementally or continuously. The axial stress is determined by dividing the indicated force by the specimen's original cross-sectional area. The appropriate slope is then calculated from the stress-strain curve, which may be derived under conditions of either increasing or decreasing forces (increasing from preload to maximum applied force or decreasing from maximum applied force to preload). This test method was approved on Sep. 15, 2010 and published January 2011, the contents of which are incorporated herein by reference in its entirety. For the referenced ASTM standards, visit the ASTM website, www.astm.org, or contact ASTM Customer Service at service@astm.org.

The term "ASTM D 1003" as used herein refers to the standard test method for determining the haze and luminous transmittance of transparent plastics. In general, this test method covers the evaluation of specific light-transmitting and wide-angle-light-scattering properties of planar sections of materials such as essentially transparent plastic. Light that is scattered upon passing through a film or sheet of a material can produce a hazy or smoky field when objects are viewed through the material. Another effect can be veiling glare, as occurs in an automobile windshield when driving into the sun. According to this method, the haze measurements are made with either a hazemeter or a spectrophotometer. This test method was approved on Apr. 15, 2011 and published April 2011, the contents of which are incorporated herein by reference in its entirety. For the referenced ASTM standards, visit the ASTM website, www.astm.org, or contact ASTM Customer Service at service@astm.org.

The term "ASTM D 2457" as used herein refers to the standard test method for determining specular gloss of plastic films and solid plastics. In general, this test method describes procedures for the measurement of gloss of plastic films and solid plastics, both opaque and transparent. Specular gloss is used primarily as a measure of the shiny appearance of films and surfaces. Precise comparisons of gloss values are meaningful only when they refer to the same measurement procedure and same general type of material. In particular, gloss values for transparent films should not be compared with those for opaque films, and vice versa. Gloss is a complex attribute of a surface which cannot be completely measured by any single number. Specular gloss usually varies with surface smoothness and flatness. It is sometimes used for comparative measurements of these surface properties. In general, the instrument used in this method shall consist of an incandescent light source furnishing an incident beam, means for locating the surface of the test specimen, and a receptor located to receive the required pyramid of rays reflected by the specimen. The receptor shall be a photosensitive device responding to visible radiation. This test method was approved on Mar. 1, 2008 and published March 2008, the contents of which are incorporated herein by reference in its entirety. For the referenced ASTM standards, visit the ASTM website, www.astm.org, or contact ASTM Customer Service at service@astm.org.

The term "ASTM D 1922" as used herein refers to the standard test method for determining the propagation tear resistance of plastic film and thin sheeting by the pendulum method. In general, this test method provides the relative ranking for tear resistance of various plastic films and thin sheetings of comparable thickness. The force in grams required to propagate tearing across a film or sheeting specimen is measured using a precisely calibrated pendulum device. Acting by gravity, the pendulum swings through an arc, tearing the specimen from a precut slit (e.g., a pendulum impulse-type testing apparatus). The specimen is held on one side by the pendulum and on the other side by a stationary member. The loss in energy by the pendulum is indicated by a pointer. The scale indication is a function of the force required to tear the specimen. This test method was approved on May 1, 2009 and published June 2009, the contents of which are incorporated herein by reference in its entirety. For the referenced ASTM standards, visit the ASTM website, www.astm.org, or contact ASTM Customer Service at service@astm.org.

The term "ASTM F 1249" as used herein refers to the standard test method for determining the water vapor transmission rate through plastic film and sheeting using a modulated infrared sensor. In general, this test method describes procedures for obtaining reliable values for the WVTR of plastic film and sheeting. A dry chamber is separated from a wet chamber of known temperature and humidity by the barrier material to be tested. The dry chamber and the wet chamber make up a diffusion cell in which the test film is sealed. Water vapor diffusing through the film mixes with the gas in the dry chamber and is carried to a pressure-modulated infrared sensor. This sensor measures the fraction of infrared energy absorbed by the water vapor and produces an electrical signal, the amplitude of which is proportional to water vapor concentration. The amplitude of the electrical signal produced by the test film is then compared to the signal produced by measurement of a calibration film of known water vapor transmission rate. This information is then used to calculate the rate at which moisture is transmitted through the material being tested. WVTR is an important property of packaging materials and can be directly related to shelf life and packaged product stability. This test method was approved on Oct. 1, 2013 and published November 2013, the contents of which are incorporated herein by reference in its entirety. For the referenced ASTM standards, visit the ASTM website, www.astm.org, or contact ASTM Customer Service at service@astm.org. Unless specified otherwise, the water vapor transmission rates reported in this disclosure were tested according to ASTM F 1249 under 37.8° C., at 100% relative humidity, and at 760 mm Hg.

The term "max force puncture" as used herein refers to a property determined by the test method for determining the puncture resistance of film. The force measurements from this test may be useful for predicting the puncture resistance of the end-use film packaging. This test was completed with the following procedure. Film samples that measured 5 inches by 5 inches were conditioned for 40 hours at 23° C. and 50% relative humidity and tested at these same conditions. Using a Sintech 1/S unit and setting the crosshead speed at 20 inches per minute, the film specimen is clamped in place, and the unit's crosshead moved the puncture probe up through the specimen until failure resulted. The max force puncture is the average maximum force to break the test specimen, which is the point that is highest on the stress/strain curve, for five specimens.

The Film

The present disclosure provides a film having an A/B/A structure. The term "A/B/A as used herein represents the arrangement of the layers within the film. The films as provided herein are composed of a layer A and a layer B. The layer A comprises a first A layer and a second A layer. In other words, the letter "A" in the A/B/A structure is either the first A layer or the second A layer. In each A/B/A structure, both the first A layer and the second A layer are present. The films as provided herein include a B layer. The layer B in the A/B/A structure is positioned between the first A layer and the second A layer. In some embodiments, the first A layer, the B layer, and the second A layer form the A/B/A structure. In some examples, the A/B/A structure may be represented as follows: the first A layer/the B layer/the second A layer.

In some embodiments, the combination of both the first A layer and the second A layer is present in an amount ranging from 25 to 65 wt. %, based upon the total weight of the A/B/A structure. The combination of both the first A layer and the second A layer may be present in an amount ranging from 30 to 65 wt. %, based upon the total weight of the A/B/A structure. The combination of both the first A layer and the second A layer may be present in an amount ranging from 35 to 65 wt. %, based upon the total weight of the A/B/A structure. The combination of both the first A layer and the second A layer may be present in an amount ranging from 40 to 65 wt. %, based upon the total weight of the A/B/A structure. The combination of both the first A layer and the second A layer may be present in an amount ranging from 45 to 65 wt. %, based upon the total weight of the A/B/A structure. The combination of both the first A layer and the second A layer may be present in an amount ranging from 50 to 65 wt. %, based upon the total weight of the A/B/A structure. The combination of both the first A layer and the second A layer may be present in an amount ranging from 55 to 65 wt. %, based upon the total weight of the A/B/A structure. The combination of both the first A layer and the second A layer may be present in an amount ranging from 57 to 63 wt. %, based upon the total weight of the A/B/A structure. The combination of both the first A layer and the second A layer may be present in an amount ranging from 58 to 62 wt. %, based upon the total weight of the A/B/A structure. In specific embodiments, the combination of both the first A layer and the second A layer is present in about 58, 59, 60, 61 or 62 wt. %, based upon the total weight of the A/B/A structure.

In some embodiments, the A/B/A structure comprises a first A layer that is present in an amount ranging from 12.5 to 32.5 wt. %, based upon the total weight of the A/B/A structure. The first A layer may be present in an amount ranging from 15 to 32.5 wt. %, based upon the total weight of the A/B/A structure. The first A layer may be present in an amount ranging from 20 to 32.5 wt. %, based upon the total weight of the A/B/A structure. The first A layer may be present in an amount ranging from 25 to 32.5 wt. %, based upon the total weight of the A/B/A structure. The first A layer may be present in an amount ranging from 27 to 32 wt. %, based upon the total weight of the A/B/A structure. The first A layer may be present in an amount ranging from 28 to 31 wt. %, based upon the total weight of the A/B/A structure. The first A layer may be present in about 27, 28, 29, 30, 31 or 32.5 wt. %, based upon the total weight of the A/B/A structure.

In some embodiments, the A/B/A structure comprises a second A layer that is present in an amount ranging from 12.5 to 32.5 wt. %, based upon the total weight of the A/B/A structure. The second A layer may be present in an amount ranging from 15 to 32.5 wt. %, based upon the total weight of the A/B/A structure. The second A layer may be present in an amount ranging from 20 to 32.5 wt. %, based upon the total weight of the A/B/A structure. The second A layer may be present in an amount ranging from 25 to 32.5 wt. %, based upon the total weight of the A/B/A structure. The second A layer may be present in an amount ranging from 27 to 32 wt. %, based upon the total weight of the A/B/A structure. The second A layer may be present in an amount ranging from 28 to 31 wt. %, based upon the total weight of the A/B/A structure. The second A layer may be present in about 27, 28, 29, 30, 31 or 32.5 wt. %, based upon the total weight of the A/B/A structure.

In some embodiments, the B layer is present in an amount ranging from 35 to 75 wt. %, based upon the total weight of the A/B/A structure. The B layer may be present in an amount ranging from 35 to 70 wt. %, based upon the total weight of the A/B/A structure. The B layer may be present in an amount ranging from 35 to 65 wt. %, based upon the total weight of the A/B/A structure. The B layer may be present in an amount ranging from 35 to 60 wt. %, based upon the total weight of the A/B/A structure. The B layer may be present in an amount ranging from 35 to 55 wt. %, based upon the total weight of the A/B/A structure. The B layer may be present in an amount ranging from 35 to 50 wt. %, based upon the total weight of the A/B/A structure. The B layer may be present in an amount ranging from 35 to 45 wt. %, based upon the total weight of the A/B/A structure. The B layer may be present in an amount ranging from 37 to 43 wt. %, based upon the total weight of the A/B/A structure. The B layer may be present in an amount ranging from 38 to 42 wt. %, based upon the total weight of the A/B/A structure. The B layer may be present in an amount of about 38, 39, 40, 41, or 42 wt. %, based upon the total weight of the A/B/A structure. The B layer is situated between the first A layer and the second A layer.

In some embodiments, the film may be made via a co-extrusion. The film may be a blown film with an A/B/A structure and film gauge between 0.70 and 1.80 mils. The film may have a gauge in a range from 0.80 and 1.70 mils. The film may have a gauge in a range from 0.90 and 1.50 mils. The film may have a gauge in a range from 0.90 and 1.30 mils. The film may have a gauge of about 1.0 mils. The film may have a gauge of from 0.7 and 1.0 mils. The film may have a gauge of about 1.25 mils.

A Layer

The first A layer and the second A layer are independently selected from any one of the A layers described herein. The A layer comprises a linear low density polyethylene (LLDPE) composition having the following properties:
  (i) a melt index in a range from 0.4 to 2.5 dg/min. (ASTM D 1238; measured at 190° C. with a load of 2.16 kg);
  (ii) a density ranging from 0.890 to 0.940 g/cm$^3$ (measured according to ASTM D 1505); and
  (iii) a polydispersity in a range from 1.8 to 6.0.

The LLDPE may include ethylene derived units copolymerized with a comonomer selected from 1-butene, 1-pentene, 1-hexene, and/or 1-octene. The LLDPE may include a metallocene-derived LLDPE, a Ziegler-Natta-derived LLDPE, and/or any LLDPE derived from any other catalyst known in the art. The LLDPE may include the comonomer in a range from 4 to 30 wt. %, based upon the total weight of the LLDPE.

In some examples, the LLDPE composition may be a blend of two or more types of polyolefins. More specifically, the LLDPE composition may be a blend of a LLDPE and a low density polyethylene (LDPE) composition. The LLDPE composition comprises:
  (i) from 94.5 to 100 wt. %, based upon the total weight of the LLDPE composition, of a LLDPE (any LLDPE or blends of LLDPE described herein); and
  (ii) from 0.0 and 5.5 wt. %, based upon the total weight of the LLDPE composition, of a LDPE composition.

In some examples, the LDPE composition has a melt index of 0.1 to 0.6 dg/min (ASTM D 1238; measured at 190° C. with a load of 2.16 kg); and density of 0.910 to 0.940 g/cm$^3$ (measured according to ASTM D 1505). In specific embodiments, the LLDPE composition includes: (i) from 98 to 99.9 wt. %, based upon the total weight of the LLDPE composition, of a LLDPE; and (ii) from 0.1 to 2 wt. %, based upon the total weight of the LLDPE, of a LDPE composition. In some embodiments, the LDPE composition is nucleated.

In some embodiments, the LLDPE composition may be nucleated. The LLDPE composition may contain from 0 to 2500 ppm by weight, based upon the total weight of the LLDPE composition, of a nucleator. The LLDPE composition may contain from 100 to 2500 ppm by weight, 500 to 2000 ppm by weight, 750 to 1800 ppm by weight, or 1000 to 1500 ppm by weight, based upon the total weight of the LLDPE composition, of a nucleator. Suitable nucleating agents include glycerol alkoxide salts, hexahydrophthalic acid salts, and the like. Also, suitable nucleating agents may include any mixture of glycerol alkoxide salts, hexahydrophthalic acid salts, and the like.

In some embodiments, the LLDPE composition includes a nucleator in the amounts mentioned herein; however, the nucleator was first blended with a LDPE to form a nucleated LDPE masterbatch composition. The nucleated LDPE masterbatch composition may include: (1) from 95 to 100 wt. %, based upon the total weight of the nucleated LDPE masterbatch composition, of a LDPE; and (2) from 0.0 to 5 wt. %, based upon the total weight of the nucleated LDPE masterbatch composition, of a nucleator.

In some embodiments, the linear low density composition comprises a nucleator. In some embodiments, the low density polyethylene composition comprises: (1) from 95 to 100 wt. %, based upon the total weight of the low density polyethylene composition, of a low density polyethylene; and (2) from 0.0 to 5 wt. %, based upon the total weight of the low density polyethylene composition, of a nucleator.

The B Layer

The B layer comprises a high density polyethylene (HDPE) composition. The HDPE composition may have a melt index that ranges from 0.4 to 2.5 dg/min. (measured according to ASTM D 1238 at 190° C. with a 2.16 kg load). In some embodiments, the HDPE composition may have a melt index ranging from 1.0 to 2.0 dg/min. In some embodiments, the HDPE composition may have a melt index of about 1.0, about 1.15 or about 2.0 dg/min.

The HDPE composition has a density ranging from 0.940 to 0.970 g/cm$^3$ (measured according to ASTM D 1505). In some embodiments, the HDPE composition has a density ranging from 0.947 to 0.960 g/cm$^3$.

The HDPE composition has a polydispersity index ranging from 1.8 to 18.0. The polydispersity for polyethylene is defined as the ratio of weight average molecular weight (Mw) and number average molecular weight (Mn). They were determined by a Waters GPCV2000 gel permeation chromatography (GPC) at 145 C equipped with a refractive index detector. Data collection was performed by Waters Alliance software and then processed by Empower software. The columns used were three Agilent Olexis columns. The solvent used was 1,2,4 trichlorobenzene (TCB). The samples were prepared at a concentration of 3.5 milligrams of polymer in 6 milliliters of solvent. The sample solution contained 300 ppm of butylated hydroxytoluene (BHT). Polyethylene samples were dissolved at 160 degrees Celsius for one hour and were shaken and checked for insoluble after first 30 minutes. The injection volume used was 300 microliters and the flow rate was 1.0 milliliters/minute.

In some embodiments, the layer B comprises a high density polyethylene (HDPE) polymer composition. In some embodiments, the HDPE composition comprises a blend containing.

(a) 40 to 100 wt. %, based upon the total weight of the HDPE polymer composition, of a high density polyethylene homopolymer or of a high density polyethylene copolymer;

(b) 0 to 50 wt. %, based upon the total weight of the HDPE polymer composition, of a linear low density polyethylene composition; and (c) 0 to 10 wt. %, based upon the total weight of the HDPE polymer composition, of a nucleated polyolefin composition.

In some embodiments, the HDPE composition includes about 100 wt. %, based upon the total weight of the HDPE composition, of a HDPE homopolymer. In some embodiments, the HDPE composition includes 100 wt. %, based upon the total weight of the HDPE composition, of a HDPE copolymer containing ethylene derived units and monomeric units derived from butene, pentene, hexene, or octene. In some embodiments, the copolymer includes a comonomer incorporation in a range from 0.01 to 4 wt. %, based upon the total weight of the HDPE.

In some embodiments, the HDPE composition includes any one of the LLDPE compositions described herein. The HDPE composition may include a linear low density polyethylene (LLDPE) composition having the following properties: (i) a melt index in a range from 0.4 to 2.5 dg/min. (ASTM D 1238; measured at 190° C. with a load of 2.16 kg); (ii) a density ranging from 0.890 to 0.940 g/cm$^3$ (measured according to ASTM D 1505); and (iii) a polydispersity in a range from 1.8 to 6.0.

The LLDPE may include ethylene derived units copolymerized with a comonomer selected from 1-butene, 1-pentene, 1-hexene, and/or 1-octene. The LLDPE may include the comonomer in a range from 4 to 30 wt. %, based upon the total weight of the LLDPE.

In some examples, the LLDPE composition may be a blend of two or more types of polyolefins. More specifically, the LLDPE composition may be a blend of a LLDPE and a low density polyethylene (LDPE) composition as described herein.

In some embodiments, the HDPE composition includes a nucleated polyolefin composition. In some embodiments, the nucleated polyolefin composition contains 95 to 99.9 wt. %, based upon the total weight of the nucleated polyolefin composition, of a polyolefin; and (2) 0.1 to 5 wt. %, based upon the total weight of the nucleated polyolefin composition, of a nucleator. In some embodiments, the polyolefin is: (i) a low density polyethylene homopolymer or copolymer; or (ii) a high density polyethylene homopolymer or copolymer.

In some embodiments, the HDPE composition may be nucleated. The HDPE composition may contain from 0 to 2500 ppm by weight, based upon the total weight of the HDPE composition, of a nucleator. The HDPE composition may contain from 100 to 2500 ppm by weight, 500 to 2000 ppm by weight, 750 to 1800 ppm by weight, or 1000 to 1500 ppm by weight, based upon the total weight of the HDPE composition, of a nucleator.

With respect to any of the nucleated compositions described herein, suitable nucleating agents include glycerol alkoxide salts, hexahydrophthalic acid salts, and the like. Also, suitable nucleating agents may include any mixture of glycerol alkoxide salts, hexahydrophthalic acid salts, and the like.

In addition to nucleating agents, the compositions described herein may include a variety of additives, including slip agents, anti-block agents and the like.

The compositions described herein were used to make blown film. The general characteristics of a blown film made as described herein are provided below for a 1.0-mil gauge film. The A/B/A structure has a 45° gloss from 60 to 80 units. The A/B/A structure has a haze from 5 to 14%. The A/B/A structure has a narrow-angle scatter from 10 to 60 units. The A/B/A structure has a 1% secant modulus in the machine direction of 40,000 to 95,000 psi or about 275 to 655 MPa. The A/B/A structure has a 1% secant modulus in the transverse direction of 50,000 to 130,000 psi or about 345 to about 900 MPa. The A/B/A structure has a machine direction Elmendorf tear of 35 to 170 grams. The A/B/A structure has a transverse direction Elmendorf tear of 250 to 600 grams. The A/B/A structure has a max force puncture of 27 to 45 Newtons. The A/B/A structure has a water vapor transmission rate of 0.25 to 0.95 g/100 si/day.

EXAMPLES

The following examples are included to demonstrate preferred embodiments of the various embodiments contemplated by the present disclosure. It should be appreciated by those of skill in the art that the techniques disclosed in the examples which follow represent techniques discovered by the inventor to function well in the practice of the embodiments of the present disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the appended claims.

Bread Freshness Experimental Procedure

Film samples were cut to a 7 inch by 10 inch size. Two pieces of the film were sealed to fusion along three edges of the film through the use of a heat sealer to make a bag. A piece of bread was inserted into this bag. After heat-sealing the fourth edge, the filled bread bags were placed in a temperature-controlled and humidity-controlled lab (23° C., at 50% relative humidity). Three specimens for each sample were weighed daily to allow calculation of the percent change in weight over time. Bread generally gets stale due to the loss of moisture so a sample with higher weight loss typically gets staler sooner than one with less weight loss.

Description of Materials Used

LDPE-1: LDPE having a density of 0.929 $g/cm^3$, an MI of 3.0 dg/min., 1600 ppm of anti-block, and 1500 ppm of erucamide as a slip additive, commercially available from Equistar Chemicals, LP having the tradename Petrothene® NA283245X02.

LDPE-2: LDPE having a density of 0.924 $g/cm^3$, an MI of 3.0 dg/min., 1600 ppm of anti-block, and 1500 ppm of erucamide as a slip additive, commercially available from Westlake Chemical having the tradename EF4060.

LDPE-3: LDPE having a density of 0.920 $g/cm^3$ and an MI of 0.18 dg/min., commercially available from Equistar Chemicals, LP having the tradename Petrothene® NA942000.

LLDPE-1: $C_4$-LLDPE having a density of 0.923 $g/cm^3$ and an MI of 1.0 dg/min., 7000 ppm of anti-block, and 1350 ppm of erucamide as a slip additive, produced using a Ziegler-Natta catalyst in a Unipol gas-phase process, commercially available from Equistar Chemicals, LP having the tradename Petrothene® GA501022.

LLDPE-2: $C_6$-LLDPE having a density of 0.923 $g/cm^3$ and an MI of 1.0 dg/min., 6500 ppm of anti-block, and 1350 ppm of erucamide as a slip additive, produced using a Ziegler-Natta catalyst in a Unipol gas-phase process, commercially available from Equistar Chemicals, LP having the tradename Petrothene® GA601032.

LLDPE-3: $C_6$-LLDPE having a density of 0.922 $g/cm^3$ and an MI of 1.0 dg/min., 5000 ppm of anti-block, and 1000 ppm of erucamide as a slip additive, produced using a metallocene catalyst in a Unipol gas-phase process.

LLDPE-4: A blend containing: (1) 99.5 wt. % LLDPE-3; and (2) 0.5 wt. % LDPE-3 prepared via drum tumbling for 20 minutes.

LLDPE-5: A blend containing: (1) 99.5 wt. % $C_6$-LLDPE having a density of 0.912 $g/cm^3$ and an MI of 1.0 dg/min., 5000 ppm of anti-block, and 1000 ppm of erucamide as a slip additive, produced using a metallocene catalyst in a Unipol gas-phase process; and (2) 0.5 wt. % LDPE-3 prepared via drum tumbling for 20 minutes.

LLDPE-6: $C_4$-LLDPE having a density of 0.930 $g/cm^3$ and an MI of 3.5 dg/min., 7000 ppm of anti-block, and 1500 ppm of erucamide as a slip additive, produced using a Ziegler-Natta catalyst in a Unipol gas-phase process, commercially available from Equistar Chemicals, LP having the tradename Petrothene® GA503027.

LLDPE-7: $C_6$-LLDPE having a density of 0.918 $g/cm^3$ and an MI of 3.5 dg/min., produced using a metallocene catalyst, commercially available from ExxonMobil having the tradename Exceed™ 3518CB.

HDPE-1: $C_8$-HDPE having a density of 0.954 $g/cm^3$ and an MI of 1.15 dg/min., produced in a multi-reactor solution process, commercially available from Equistar Chemicals, LP having the tradename Alathon® M5410.

HDPE-2: $C_8$-HDPE having a density of 0.947 $g/cm^3$ and an MI of 1.0 dg/min., produced in a multi-reactor solution process.

HDPE-3: A blend containing: (1) 90 wt. % of a homopolymer-HDPE having a density of 0.960 $g/cm^3$ and an MI of 1.0 dg/min., produced in a multi-reactor solution process; and (2) 10 wt. % Adt-1 prepared via drum tumbling for 20 minutes.

HDPE-4: Homopolymer-HDPE having a density of 0.958 $g/cm^3$ and an MI of 2.0 dg/min., produced in a multi-reactor solution process, commercially available from Equistar Chemicals, LP having the tradename Alathon® M6020.

Adt-1: Polymer compound containing: (1) 99.5 wt. % of HDPE-4; and (2) 0.5 wt. % of a nucleator, Hyperform HPN-20E, commercially available from Milliken and Company, produced on a twin-screw extruder.

Adt-2: A nucleating agent masterbatch containing: (1) 96 wt. % of a LDPE; and (2) 4 wt. %, of a nucleator, Hyperform HPN-20E, commercially available from A. Schulman having the tradename Polybatch® CLR122.

Example 1

Using a 3-layer, Brampton Engineering blown film line with a die size of 6 inches, a 1.0 mil film with a 30-40-30 A/B/A layer distribution was made using LLDPE-1 in the A layers and HDPE-1 in the B layer. The blow-up ratio was 3.0:1, and the frost-line height was 25 inches. Total output was 120 pounds per hour. The die gap was 0.060 inches, and the line had a dual-lip air ring. The skin layer extruders were each smooth bore with a 1.5-inch screw with mixing sections and a 30:1 L/D ratio. The core layer extruder was also smooth bore with a 2-inch barrier screw and a 30:1 L/D ratio.

Example 2

Example 1 is repeated except LLDPE-1 was nucleated with the addition of 2 wt. % Adt-2. Example 2 was mixed via drum tumbling for 20 minutes.

Example 3

Example 1 is repeated except LLDPE-1 was nucleated with the addition of 5 wt. % Adt-2. Example 3 was mixed via drum tumbling for 20 minutes.

Example 4

Example 2 is repeated except HDPE-1 was nucleated with the addition of 2 wt. % Adt-2. Example 4 was mixed via drum tumbling for 20 minutes.

Example 5

Example 2 is repeated except the B layer is a blend of: (1) 48 wt. % LLDPE-1, (2) 48 wt. % HDPE-1, and (3) 2 wt. % Adt-2. Example 5 was mixed via drum tumbling for 20 minutes.

Example 6

Example 2 is repeated except the B layer used HDPE-2.

Example 7

Example 1 is repeated except the A layers used LLDPE-2.

Example 8

Example 7 is repeated except LLDPE-2 was nucleated with the addition of 2 wt. % of Adt-2. Example 8 was mixed via drum tumbling for 20 minutes.

Example 9

Example 1 was repeated except the A layers used LLDPE-3, the B layer used HDPE-3, the blow-up ratio was 2.65:1, and the frost-line height was 19.5 inches.

Example 10

Example 9 was repeated except the A layers used LLDPE-4.

Example 11

Example 10 was repeated except the layer distribution was 15-70-15.

Example 12

Example 10 was repeated except the B layer used HDPE-2.

Example 13

Example 10 was repeated except the B layer used HDPE-4.

Example 14

Example 9 was repeated except the A layers used LLDPE-5.

Comparative Example 1

Example 1 is repeated except the B layer used LLDPE-1.

Comparative Example 2

Comparative Example 1 is repeated except all layers were nucleated with the addition of 2 wt. % Adt-2. Comparative Example 2 was mixed via drum tumbling for 20 minutes.

Comparative Example 3

Using a 3-extruder, Black Clawson cast film line with a die size of 41 inches and die gap of 0.030 inches, a 1.25 mil film was made using LDPE-1 in all three extruders. The melt temperature was 530° F., and the total output was 240 pounds per hour. Two of the extruders used 2-inch diameter screws while the remaining screw was 2.5 inches. The L/D ratio for all extruders was 28:1.

Comparative Example 4

Comparative Example 3 was repeated except the resulting film was 1.0 mil in gauge.

Comparative Example 5

Comparative Example 3 was repeated except a blend of: (1) 60 wt. % of LDPE-1; and (2) 40 wt. % LLDPE-6 was prepared via drum tumbling for 20 minutes and the blend was used in all three extruders.

Comparative Example 6

Comparative Example 5 was repeated except the resulting film was 1.0 mil in gauge.

Comparative Example 5

Comparative Example 3 was repeated except a blend of: (1) 60 wt. % of LDPE-2; and (2) 40 wt. % LLDPE-7 was prepared via drum tumbling for 20 minutes and the blend was used in all three extruders.

TABLE 1

Optics and Modulus Comparison

| | 45° Gloss Units | Haze % | Narrow Angle Scatter Units | 1% Secant Mod (MD) psi (MPa) | 1% Secant Mod (TD) Psi (MPa) |
|---|---|---|---|---|---|
| Ex. 1 | 66 | 12.4 | 11 | 64,000 (441) | 75,400 (520) |
| Ex. 2 | 65 | 12.2 | 16 | 63,100 (435) | 79,400 (547) |
| Ex. 3 | 65 | 12.9 | 15 | 64,000 (441) | 81,100 (559) |
| Ex. 4 | 66 | 11.8 | 16 | 65,300 (450) | 81,000 (558) |
| Ex. 5 | 67 | 11.4 | 13 | 43,600 (300) | 53,100 (366) |
| Ex. 6 | 65 | 11.6 | 15 | 54,700 (377) | 67,300 (464) |
| Ex. 7 | 67 | 12.0 | 19 | 63,000 (434) | 78,700 (542) |
| Ex. 8 | 67 | 12.1 | 21 | 67,600 (466) | 81,100 (559) |
| Ex. 9 | 71 | 9.5 | 20 | 69,700 (480) | 76,400 (527) |
| Ex. 10 | 74 | 8.6 | 42 | 66,000 (455) | 80,200 (553) |
| Ex. 11 | 68 | 10.0 | 40 | 90,600 (624) | 124,000 (855) |
| Ex. 12 | 76 | 7.7 | 41 | 52,100 (359) | 63,700 (439) |
| Ex. 13 | 73 | 9.6 | 29 | 63,100 (435) | 78,900 (543) |
| Ex. 14 | 78 | 6.5 | 55 | 63,100 (435) | 78,500 (541) |
| Comp. Ex. 1 | 41 | 19.6 | 10 | 30,000 (206) | 32,300 (222) |
| Comp. Ex. 2 | 48 | 17.2 | 12 | 30,000 (206) | 35,800 (247) |
| Comp. Ex. 3 | 81 | 5.2 | 32 | 23,100 (159) | 25,000 (172) |
| Comp. Ex. 4 | 80 | 5.2 | 34 | 24,300 (167) | 24,300 (167) |
| Comp. Ex. 5 | 80 | 5.9 | 37 | 28,100 (193) | 30,700 (212) |
| Comp. Ex. 6 | 80 | 5.5 | 38 | 30,300 (209) | 30,800 (212) |
| Comp. Ex. 7 | 85 | 3.7 | 23 | 27,300 (188) | 28,200 (194) |

TABLE 2

Toughness Comparison

| | Tear Strength (MD) g | Tear Strength (TD) g | Maxforce Puncture N |
|---|---|---|---|
| Ex. 1 | 65 | 260 | 35 |
| Ex. 2 | 45 | 285 | 30 |
| Ex. 3 | 49 | 299 | 32 |
| Ex. 4 | 44 | 321 | 30 |
| Ex. 5 | 74 | 360 | 32 |
| Ex. 6 | 46 | 312 | 29 |
| Ex. 7 | 83 | 414 | 35 |

TABLE 2-continued

Toughness Comparison

|  | Tear Strength (MD) g | Tear Strength (TD) g | Maxforce Puncture N |
|---|---|---|---|
| Ex. 8 | 74 | 400 | 35 |
| Ex. 9 | 142 | 390 | 32 |
| Ex. 10 | 123 | 407 | 32 |
| Ex. 11 | 38 | 376 | 30 |
| Ex. 12 | 157 | 507 | 31 |
| Ex. 13 | 151 | 422 | 32 |
| Ex. 14 | 130 | 437 | 40 |
| Comp. Ex. 1 | 135 | 328 | 36 |
| Comp. Ex. 2 | 118 | 333 | 36 |
| Comp. Ex. 3 | 249 | 325 | 15 |
| Comp. Ex. 4 | 227 | 282 | 13 |
| Comp. Ex. 5 | 135 | 344 | 15 |
| Comp. Ex. 6 | 98 | 285 | 14 |
| Comp. Ex. 7 | 133 | 344 | 21 |

TABLE 3

Barrier and Food Freshness Comparison

|  | WVTR g/100si/day | Multi-Grain Bread (13-Day Testing) % weight loss | Enriched White Bread (18-Day Testing) % weight loss |
|---|---|---|---|
| Ex. 1 | 0.68 | Not tested | Not tested |
| Ex. 2 | 0.65 | Not tested | Not tested |
| Ex. 3 | 0.54 | Not tested | Not tested |
| Ex. 4 | 0.47 | 1.2% | Not tested |
| Ex. 5 | 0.84 | Not tested | Not tested |
| Ex. 6 | 0.61 | 1.6% | Not tested |
| Ex. 7 | 0.69 | Not tested | Not tested |
| Ex. 8 | 0.56 | Not tested | Not tested |
| Ex. 9 | 0.47 | Not tested | Not tested |
| Ex. 10 | 0.48 | Not tested | 3.0% |
| Ex. 11 | 0.29 | Not tested | Not tested |
| Ex. 12 | 0.73 | Not tested | 4.1% |
| Ex. 13 | 0.60 | Not tested | Not tested |
| Ex. 14 | 0.48 | Not tested | 2.3% |
| Comp. Ex. 1 | 1.02 | 2.7% | Not tested |
| Comp. Ex. 2 | 1.16 | Not tested | Not tested |
| Comp. Ex. 3 | 0.68 | 2.0% | Not tested |
| Comp. Ex. 4 | 0.73 | Not tested | Not tested |
| Comp. Ex. 5 | 0.77 | 1.9% | Not tested |
| Comp. Ex. 6 | 1.03 | Not tested | Not tested |
| Comp. Ex. 7 | 0.83 | Not tested | 5.0% |

Although the present disclosure and its advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the present disclosure, processes, machines, manufacture, compositions of matter, means, methods, or steps, presently existing or later to be developed that perform substantially the same function or achieve substantially the same result as the corresponding illustrative embodiments described herein may be utilized without departing from the scope of the appended claims. Accordingly, the appended claims are intended to include within their scope such processes, machines, manufacture, compositions of matter, means, methods, or steps.

What is claimed is:

1. A film having an A/B/A structure comprising:
   (A) a layer A, wherein the layer A:
      (i) is present in an amount ranging from 25 to 65 wt. %, based upon the total weight of the A/B/A structure, and
      (ii) the layer A comprises a first A layer and a second A layer, the first A layer and second A layer each independently comprise linear low density polyethylene; and
   (B) a layer B, wherein the layer B comprises high density polyethylene:
      (i) is present in an amount ranging from 35 to 75 wt. %, based upon the total weight of the A/B/A structure,
      (ii) the layer B is positioned between the first A layer and the second A layer,
   wherein the film has a gauge from 0.7 to 1.8 mils, and
   wherein the film has a water vapor transmission rate of 0.25 to 0.95 g/100 si/day.

2. The film of claim 1, wherein the first A layer is present in an amount ranging from 12.5 to 32.5 wt. %, based upon the total weight of the A/B/A structure.

3. The film of claim 2, wherein the second A layer is present in an amount ranging from 12.5 to 32.5 wt. %, based upon the total weight of the A/B/A structure.

4. The film of claim 1, wherein first A layer and the second A layer further comprise:
   (i) from 94.5 to 100 wt. %, based upon the total weight of the linear low density polyethylene composition, of a LLDPE; and
   (ii) from 0.0 and 5.5 wt. %, based upon the total weight of the linear low density polyethylene composition, of a low density polyethylene composition.

5. The film of claim 4, wherein the linear low density polyethylene composition has a melt index ranging from 0.4 to 2.5 dg/min, measured according to ASTM D 1238 at 190° C. using a load of 2.16 kg.

6. The film of claim 5, wherein the linear low density polyethylene composition has a density ranging from 0.890 to 0.940 g/cm$^3$.

7. The film of claim 6, wherein the linear low density polyethylene composition has a polydispersity ranging from 1.8 to 6.0.

8. The film of claim 4, wherein the low density polyethylene composition has a melt index ranging from 0.1 to 0.6 dg/min, measured according to ASTM D 1238 at 190° C. using a load of 2.16 kg.

9. The film of claim 8, wherein the low density polyethylene composition has a density ranging from 0.910 to 0.940 g/cm$^3$.

10. The film of claim 4, wherein the linear low density polyethylene composition comprises a nucleator.

11. The film of claim 1, wherein the layer B further comprises:
   (a) 40 to 100 wt. %, based upon the total weight of the high density polyethylene composition, of a high density polyethylene homopolymer or of a high density polyethylene copolymer;
   (b) 0 to 50 wt. %, based upon the total weight of the high density polyethylene composition, of a linear low density polyethylene composition; and
   (c) 0 to 10 wt. %, based upon the total weight of the high density polyethylene composition, of a nucleated polyolefin composition.

12. The film of claim 11, wherein the high density polyethylene composition has a melt index ranging from 0.4 to 2.5 dg/min, measured according to ASTM D 1238 at 190° C. using a load of 2.16 kg.

13. The film of claim 11, wherein the high density polyethylene composition has a polydispersity ranging from 1.8 to 18.

14. The film of claim 13, wherein the high density polyethylene composition comprises a nucleator.

15. The film of claim 1, wherein the film has a gloss measured at 45° ranging from 60 to 80.

16. The film of claim 1, wherein the film has a haze ranging from 5 to 14% and a narrow angle scatter from 10 to 60.

17. The film of claim 1, wherein the film has a transverse direction Elmendorf tear of 250 to 600 grams.

18. The film of claim 1, wherein the film has a max force puncture of 27 to 45 N.

* * * * *